United States Patent [19]

Hunt

[11] 4,121,124
[45] Oct. 17, 1978

[54] ELECTRODYNAMIC FORCE GENERATOR

[76] Inventor: Frederick C. Hunt, 10246 Clipper Cove, Aurora, Ohio 44202

[21] Appl. No.: 709,008

[22] Filed: Jul. 26, 1976

[51] Int. Cl.² .................................................. H02H 33/02
[52] U.S. Cl. ...................................... 310/13; 310/27; 310/42
[58] Field of Search ......................... 310/13, 27, 25, 29

[56] References Cited

U.S. PATENT DOCUMENTS

| | | | |
|---|---|---|---|
| 2,798,972 | 7/1957 | Booth | 310/27 |
| 3,075,100 | 1/1963 | Efromson | 310/27 |
| 3,106,653 | 10/1963 | Fowler | 310/27 |
| 3,417,268 | 12/1968 | Lace | 310/27 |
| 3,896,319 | 7/1975 | Chari | 310/27 X |

FOREIGN PATENT DOCUMENTS

| | | | |
|---|---|---|---|
| 1,390,231 | 1/1965 | France | 310/27 |
| 682,667 | 11/1952 | United Kingdom | 310/27 |

*Primary Examiner*—Donovan F. Duggan
*Attorney, Agent, or Firm*—Baldwin, Egan, Walling & Fetzer

[57] ABSTRACT

An electrodynamic force generator or vibrator employing plural ring permanent magnets and a round magnetic structure of the center gap type that is split on a horizontal plane passing through the center and a support and guidance system for supporting the vibratory table and coil consisting of a plurality of horizontal damped cantilever springs joined to "C" shaped damped compensating springs. Typically, a round drive coil of plural turns surrounds a central core or pole of the magnetic structure and is influenced by flux on all sides. Shorted turn coils surround the drive coil and are stationary upon the outer pole to provide reduction of inductance. The drive coil is attached to a table structure which is supported and guided in the magnet structure.

The support and guidance system for the table and drive coil of the force generator consists of three or more sets of horizontal damped cantilever springs joined to a like number of "C" shaped essentially vertical damped springs which compensate for the shortening effect of the horizontal spring during long excursion of the table of the force generator.

4 Claims, 5 Drawing Figures

ELECTRODYNAMIC FORCE GENERATOR

BACKGROUND OF THE INVENTION

The invention pertains to electrodynamic force generators commonly referred to as electrodynamic shakers or linear motion transducers.

The linear motion generator evolved from early dynamic loudspeakers. These had a single ended magnetic structure, a moveable coil within the single ended gap, and a load, the loudspeaker cone, immediately adjacent to the coil and attached thereto.

This structure type has certain disadvantages, among which are, high leakage flux in the load area and inefficiency of the magnetic circuit because of high flux leakage.

These disadvantages were overcome by the center gap electromagnetic structures first introduced in the middle 1950's. Permanent magnet variations of the design were produced in the 1960's but suffered from inefficient (70–85%) utilization of the maximum energy product of the best available magnet materials because of failure to magnetize the magnets in a relatively complete magnet structure. A resultant and major disadvantage of these previous designs was increased weight and cost for a given output force capability. That these magnet types must be magnetized in a complete magnet structure to obtain the maximum energy product is well documented in loudspeaker design literature.

Likewise, in prior force generators, early coil and table support systems were patterned after the diaphragm supports commonly used in conventional loudspeakers. However for structures larger than the typical speaker, the diaphragm type of support proved to be inadequate.

Single cantilever beam flexures at opposite ends of a coil and table structure were later employed. The beam was rigidly fixed at both ends and as a result, the motion of the structure followed a curved path rather than the straight line path which is desired.

Still later systems used cantilever springs with rubber in shear at the end away from the table/coil structure with additional rubber shear blocks between the table/coil structure and the fixed body of the force generator which were used to support part of the weight of the table structure and the test package.

A loop type of flexure (ref: U.S. Pat. No. 3,194,992) was developed which satisfied both load support and guidance requirements. A disadvantage of this design, however, was the high weight of the spring which detracted from the weight of test package that could be vibrated. Additionally, there was difficulty in maintaining the required damping in the assembly which consisted of many layers of a thin metallic material in a roll form using friction between layers as the only damping medium.

SUMMARY OF THE INVENTION

An electrodynamic force generator, shaker or linear motion transducer wherein is included two loudspeaker type magnet structures assembled into a center gap structure after magnetising. Two similar gap end structures are assembled, each composed of a central core or pole, an end plate, one or more ring magnets and an outer pole plate. A shorted turn coil is stationary on the outer pole plate. The two separate assemblies or halves of the final structure are magnetized in the same polarity to fully saturate the ring magnets. When the two halves are assembled into the final configuration, the gap flux density is increased 15–20% because of reduced leakage. The configuration provides a desirably large mechanical force for a given weight of magnet structure materials, approximately 2 pounds peak force for each pound of structure weight. Prior art permanent magnet devices produce approximately $\frac{1}{2}$ to 1-$\frac{1}{2}$ pounds peak force for each pound of structure weight.

The support and guidance system for the vibratory table includes flat cantilever springs interleaved with foam damping material, joined to "C" shaped springs which are interleaved with solid elastomeric damping to provide improved damping characteristics and a significant reduction in assembled cost.

Each spring assembly includes two or more flat cantilever springs with foam damping material between each pair of leaves. Solid light weight spacers separate the springs providing space for the damping material. The springs are rigidly bolted to the table assembly and to the free end of a "C" shaped spring consisting of two elements with a space between for an elastomeric damping material.

DESCRIPTION OF THE MAGNET STRUCTURE

Figure 3:
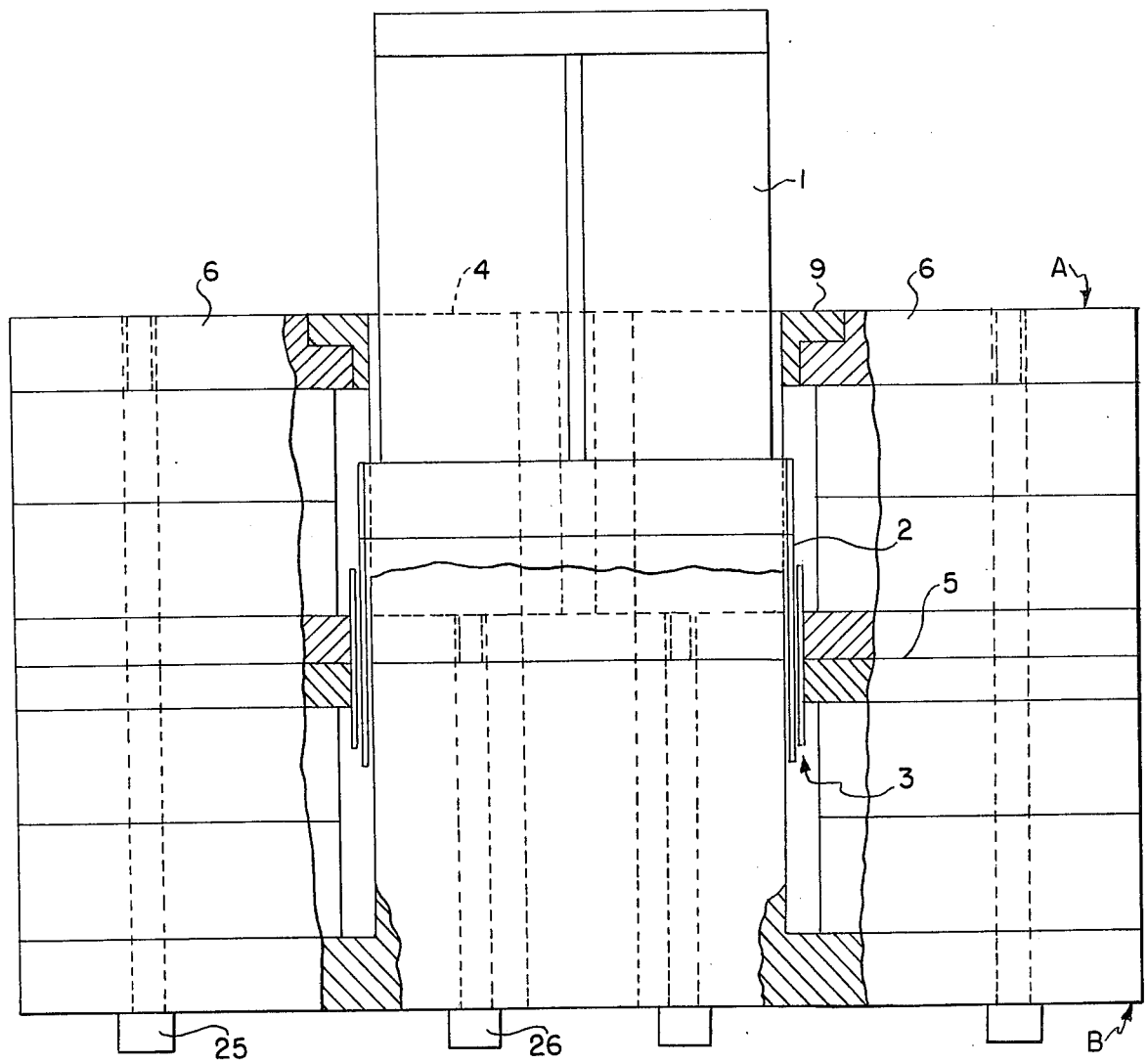
FIG. 3 is a full section of the assembly including armature.
Figure 4:
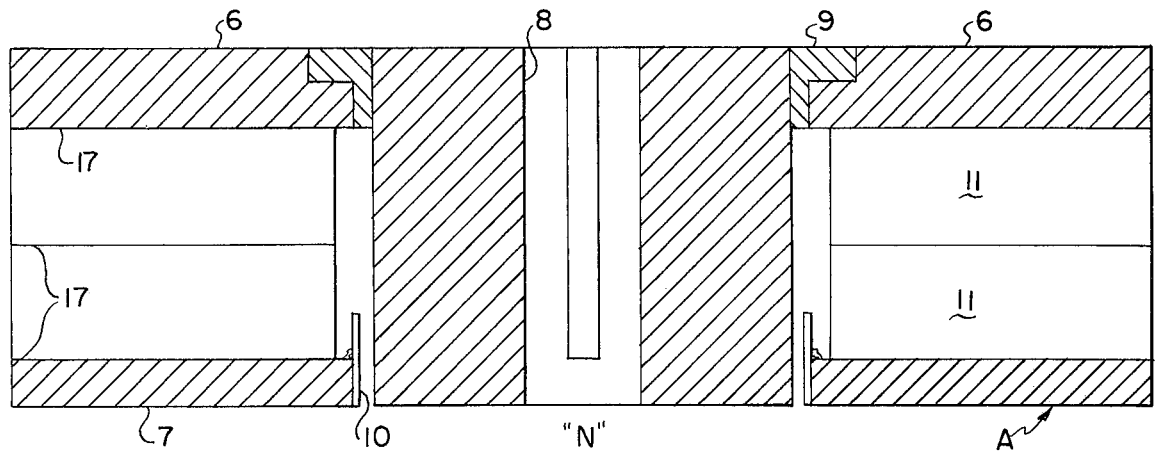
FIG. 4 is a full section of the upper half of the magnet structure.
Figure 5:
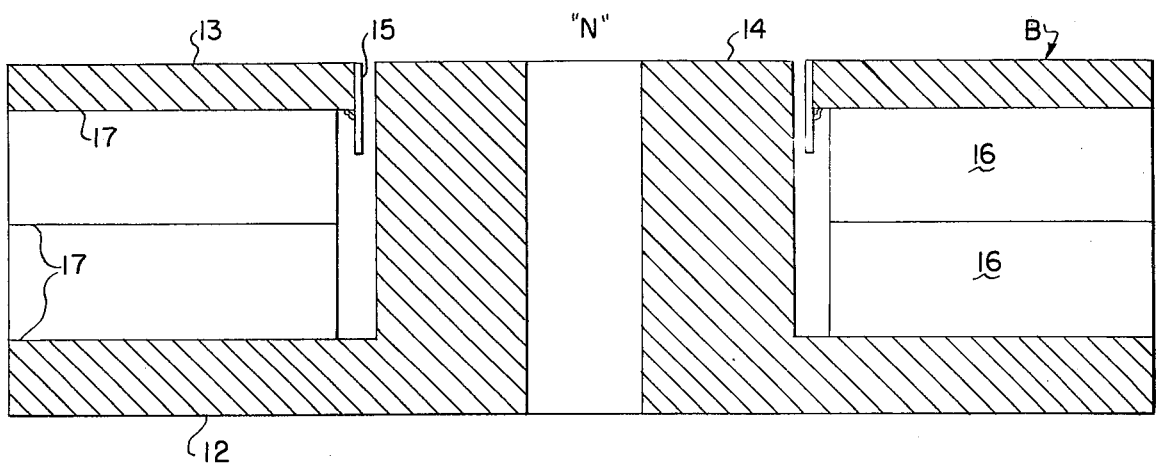
FIG. 5 is a full section of the lower half of the magnet structure.

Referring to FIGS. 3, 4 and 5 of the drawings, the basic magnet structure comprises upper and lower annular magnet assemblies A and B which are placed one on top of the other to form the cylinder contour of said structure.

The magnet assemblies A and B are disposed in axially spaced relation by interposed pole plate 7 of the top assembly A and a similar pole plate 13 for the bottom assembly B.

A table structure 1 is joined to a drive coil 2 which is positioned in an annular airgap 3 formed by a center core or pole 4 and an outer plate or pole 5. The coil 2 moves in the axial direction in the annular gap 3 driving the table.

The magnet field structure may be magnetized in conventional magnetizers as to develop maximum energy output of which the magnet materials are capable.

In FIG. 4, the upper half of the magnet structure is depicted. The structure is composed of a top plate 6, the center plate or outer pole plate 7, a center core or pole 8, a top plate insert 9 which is temporarily removeable after assembly of the total magnet structure to allow installation of the table structure and drive coil, said plate insert being thereafter reinserted into position. A shorted turn coil 10 and one or more ring magnets 11 which are used in conventional loudspeaker assemblies are also part of the magnet structure as illustrated. While various magnetic materials may be used, for low cost and satisfactory magnetic field strength and retentivity, ceramic permanent magnets are preferred, such as a grade 5 barium carbonate — iron oxide, or a grade 8 strontium carbonate — iron oxide material.

This assembly, similar to a loudspeaker assembly, can be magnetized in conventional magnetizers as mentioned above such as the electrical discharge, impulse or electromagnet types. A north pole is shown at the gap end for reference only to depict relative polarity of the upper and lower halves of the magnet structures.

In FIG. 5 the lower half of the magnet structure is depicted. The structure is composed of a bottom plate 12, a center plate or outer pole plate 13, a center core or pole 14, a shorted turn coil 15 and one or more ring magnets 16. This assembly can also be magnetized in conventional magnetizers. A north pole is shown at the gap end for reference.

The elements shown in the assemblies of FIG. 4 and FIG. 5 are retained in the desired position using an epoxy adhesive 17 between the ring magnets and plates as indicated. The two halves of the final structure are then joined together as shown in FIG. 3 using long bolts or studs 25 and 26.

DESCRIPTION OF THE SUPPORT AND GUIDANCE SYSTEM

Figure 1:
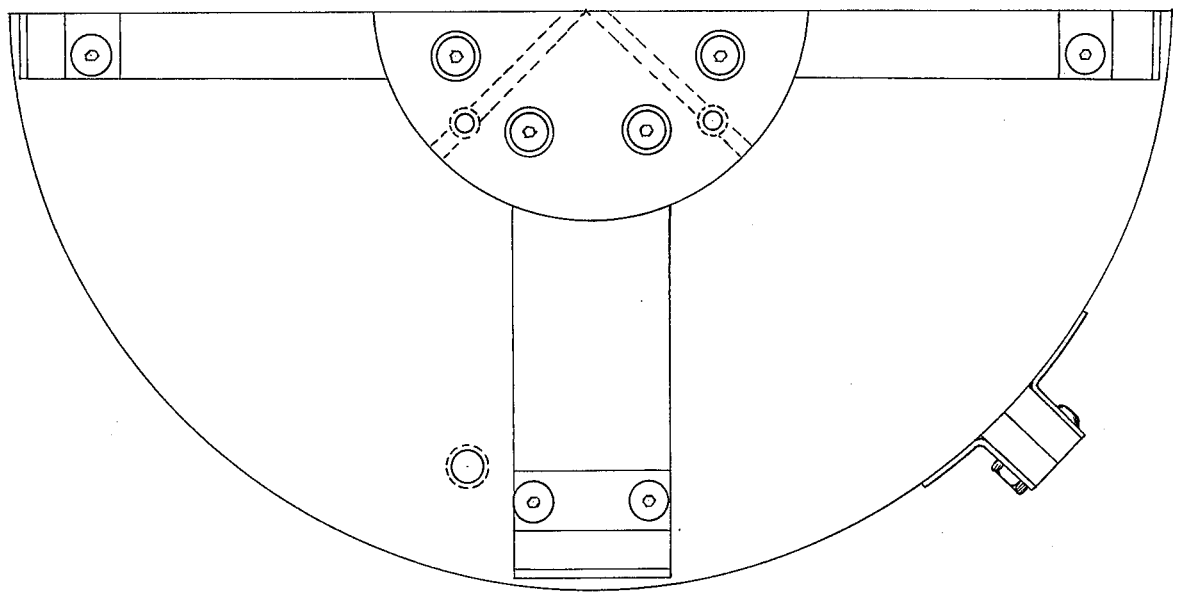
FIG. 1 is a partial plan view of the permanent magnet electrodynamic force generator of the present invention.
Figure 2:
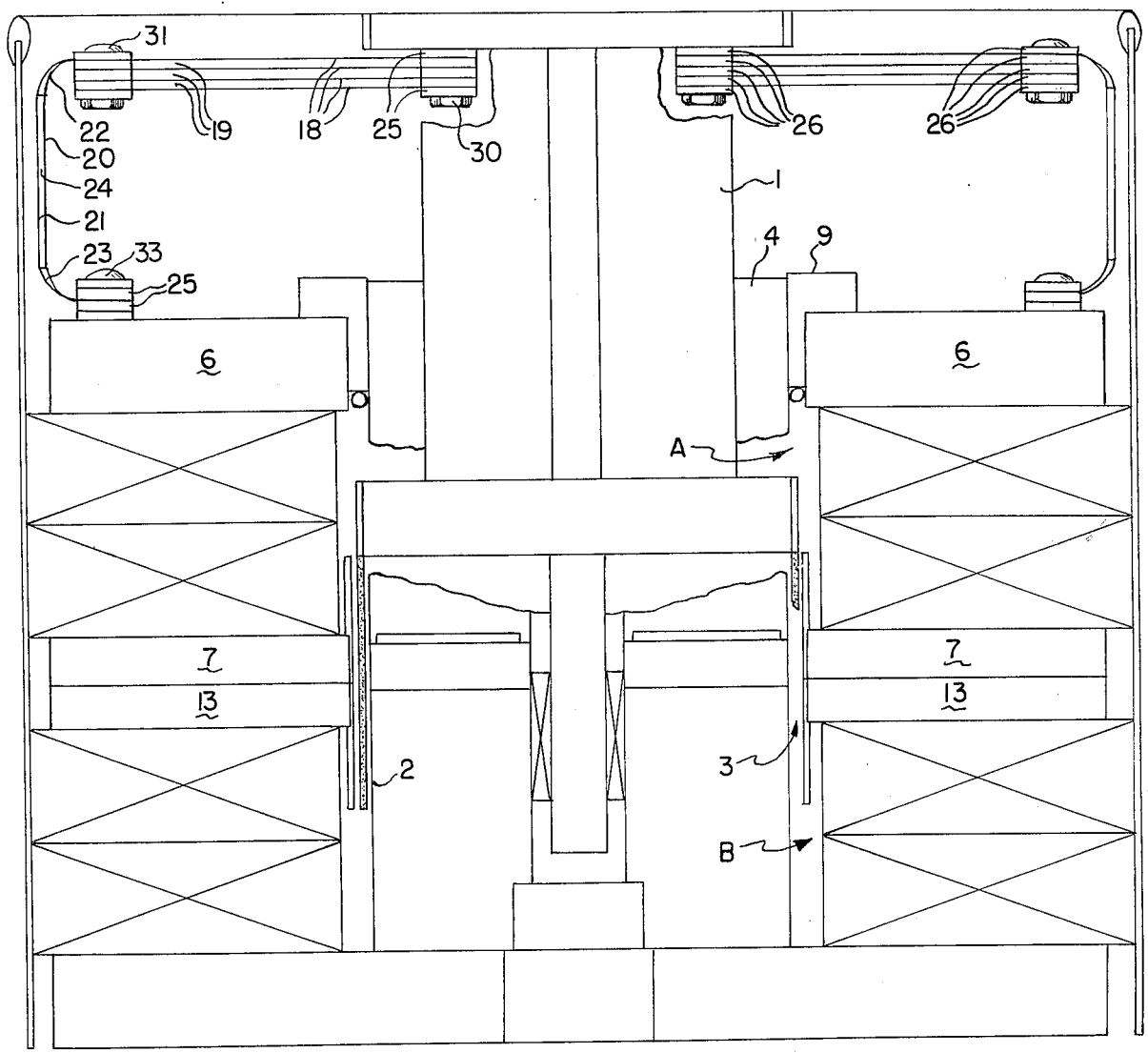
FIG. 2 is a full section and partial top view of the generator showing the table/drive coil assembly and support and guidance spring assembly.

In FIGS. 1 and 2, the table support and guidance system is depicted and include the table structure 1 which, as aforementioned is joined to drive coil 2 positioned in the annular airgap 3. The table 1 and coil 2 are supported and positioned in the annular airgap 3 by three or more spring assemblies consisting of flat cantilever springs 18 with interspaced damping material 19 and attached to the table structure 1 and "C" springs 20 and 21 with bolts 30, 31 respectively. Springs 20 and 21 are shaped to allow direct attachment at one end to top plate 6 and at the opposite end to the outer end of flat springs 18 as shown in FIG. 2 with bolts 33, 31 respectively. Radius 22 of spring 20 is 1/16 inch more or less and radius 23 of spring 21 is larger by the thickness of interspaced damping material 24 which is 1/16 inch more or less.

The flat cantilever and "C" shaped springs may be, conveniently manufactured from metals such as beryllium copper or spring steel in the form of stampings. Alternately, the springs could be formed from insulating materials such as epoxy-fiberglass laminates or laminating materials.

When made from a metal such as beryllium copper, the spring assembly serves as a convenient means for conducting electric current to and from coil 2. For this purpose, solid spacers 25, manufactured from an insulating material such as phenolic are used to insulate the current carrying springs from the table 1 and top plate 6. All remaining spring assemblies are mounted with metallic spacers 26 to provide a convenient safety ground path from table 1 to top plate 6 which is connected to an appropriate earth ground through the power cable (not shown) for the force generator.

In operation, a source of alternating current (not shown) is connected to the drive coil 2 and produces an alternating flux which interacts with the unidirectional flux produced by the permanent magnet structure to develop vibratory forces in the well known and conventional manner.

The effective gap flux density is increased 15–20% because of reduced leakage due to the above described construction.

Also, as aforementioned, the magnet structure provides a desirably large mechanical force for a given weight of magnet structure materials, approximately 2 pounds peak force for each pound of structure weight. Prior art permanent magnet devices produce approximately ⅓ to 1 ⅓ pounds peak force for each pound of structure weight.

What is claimed is:

1. A center gap permanent magnet electrodynamic force generator comprising upper and bottom annular permanent magnet sections, the upper section comprising a top plate, an outer pole plate, a center pole and at least one ring magnet interposed between the top plate and the outer pole plate, the bottom section comprising a bottom plate, a center pole, an outer pole plate and at least one ring magnet interposed between the bottom plate and the outer pole plate, said sections being separately magnetized as a sub-assembly prior to the assembly thereof in the complete generator, said sub-assemblies being assembled as a unitary generator structure on a single axis with the outer pole plate of each said sub-assembly abutting each other to form a split center plate for said structure so as to provide a maximum flux density for the magnet material used, the magnetic field through the magnets of each sub-assembly being parallel to the axis of said structure and in opposition to each other, said structure being cylindrical and provided with a center air gap inwardly adjacent said center plate, and a table structure positioned in said air gap.

2. A center gap permanent magnet structure as defined in claim 1 and wherein each annular section is provided with a shorted turn coil located at the peripheral edge of the center gap.

3. A center gap permanent magnet structure as defined in claim 1 and wherein each annular section includes at least one ring magnet.

4. A center gap permanent magnet structure as defined in claim 1 and wherein the support and guidance system for the table and drive coil consists of a plurality of sets of horizontal damped cantilever springs joined to a like number of "C" shaped essentially vertical damped springs which compensate for the shortening effect of the horizontal spring during long excursion of the table of the force generator.

* * * * *